US009663081B2

(12) United States Patent
Ryu

(10) Patent No.: US 9,663,081 B2
(45) Date of Patent: May 30, 2017

(54) HYDRAULIC UNIT OF BRAKE SYSTEM

(71) Applicant: MANDO CORPORATION, Pyeongtaek-si, Gyeonggi-do (KR)

(72) Inventor: Dong-Yo Ryu, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 349 days.

(21) Appl. No.: 14/308,317

(22) Filed: Jun. 18, 2014

(65) Prior Publication Data

US 2015/0166031 A1      Jun. 18, 2015

(30) Foreign Application Priority Data

Dec. 12, 2013   (KR) .................. 10-2013-0154322

(51) Int. Cl.
*F16K 11/20*      (2006.01)
*B60T 8/36*       (2006.01)
*B60T 11/34*      (2006.01)
*B60T 11/28*      (2006.01)

(52) U.S. Cl.
CPC ............... *B60T 8/368* (2013.01); *B60T 11/28* (2013.01); *B60T 11/34* (2013.01)

(58) Field of Classification Search
CPC ................................ B60T 11/34; B60T 8/368
USPC .................................................. 60/545, 591
See application file for complete search history.

(56) References Cited

U.S. PATENT DOCUMENTS 4,929,038 A * 5/1990 Reinartz ............... B60T 8/3675
137/596.17
5,826,952 A * 10/1998 Feigel ....................... B60T 7/12
303/113.2

FOREIGN PATENT DOCUMENTS

KR        1020110014204 A      2/2011

* cited by examiner

*Primary Examiner* — Thomas E Lazo
*Assistant Examiner* — Daniel Collins
(74) *Attorney, Agent, or Firm* — Hauptman Ham, LLP

(57) ABSTRACT

Disclosed herein is a hydraulic unit of a brake system. According to one embodiment of the present invention, the hydraulic unit of a brake system includes a master cylinder configured to generate a hydraulic pressure to supply a braking hydraulic pressure to a wheel cylinder of a vehicle, a valve block coupled with the master cylinder to transmit the braking hydraulic pressure to the wheel cylinder and having a plurality of valves and borers, and an electronic control unit (ECU) installed at the valve block to control the plurality of valves, wherein a plurality of oil passages configured to connect the bores with hydraulic ports formed at the master cylinder are formed on a surface of the valve block to have straight lines and curved lines, and the plurality of oil passages are engraved on the surface of the valve block.

3 Claims, 3 Drawing Sheets

HYDRAULIC UNIT OF BRAKE SYSTEM

CROSS-REFERENCE TO RELATED APPLICATION

This application claims the benefit of Korean Patent Application No. P2013-0154322, filed on Dec. 12, 2013 in the Korean Intellectual Property Office, the disclosure of which is incorporated herein by reference.

BACKGROUND

1. Field

Embodiments of the present invention relate to a hydraulic unit of a brake system, and more particularly, to a hydraulic unit of a brake system, which may provide a compact product through a free design of a hydraulic passage, and may also reduce a weight thereof.

2. Description of the Related Art

In general, a brake apparatus is provided to a vehicle, and an electronic controlled brake system is used to enhance performance of the brake apparatus. The electronic controlled brake system controls or supplies a braking hydraulic pressure generated by a brake pedal force to a wheel cylinder through various control systems according to a using purpose, thereby obtaining strong and stable braking force.

The electronic controlled brake system has a reserver configured to store oil installed thereabove, and includes a master cylinder configured to generate a hydraulic pressure, a valve block coupled with the master cylinder and having a hydraulic line therein to transmit the hydraulic pressure to the wheel cylinder, and an electronic control unit (ECU) installed at the valve block to control a valve provided in the valve block.

In the electronic controlled brake system, an oil passage is designed and formed at the valve block to control the hydraulic pressure transmitted to the wheel cylinder according to a function thereof. The valve block is a well-known technology used in the brake system, and is also disclosed in Korean Patent Publication No. 10-2011-0014204, or the like. More specifically, referring to FIG. 1, a hole is machined from an outer side to form the oil passage in the valve block.

However, in order to connect the oil passages in the valve block, for example, when the oil passages are connected in an arrow direction of FIG. 1, the holes should be machines multiple times and then connected, and thus a machining cycle time is increased, and a manufacturing cost is also increased. Further, a design of the oil passage is difficult, a size and a thickness of the valve block are increased to secure a clearance, and a degree of freedom of component (valve) arrangement is lowered.

PRIOR ART DOCUMENTS

Patent Documents (Patent document) Korean Patent Publication No. 10-2011-0014204 (Continental Teves AG & CO.OHG) published on Feb. 10, 2011

SUMMARY

Therefore, it is an aspect of the present invention to provide a hydraulic unit of a brake system, which may provide a compact product through a free design forming straight-line and curved passages at a surface of a valve block, and may also reduce a weight thereof.

Additional aspects of the invention will be set forth in part in the description which follows and, in part, will be obvious from the description, or may be learned by practice of the invention.

In accordance with one aspect of the present invention, a hydraulic unit of a brake system includes a master cylinder configured to generate a hydraulic pressure to supply a braking hydraulic pressure to a wheel cylinder of a vehicle, a valve block coupled with the master cylinder to transmit the braking hydraulic pressure to the wheel cylinder and having a plurality of valves and borers, and an ECU installed at the valve block to control the plurality of valves, wherein a plurality of oil passages configured to connect the bores with hydraulic ports formed at the master cylinder are formed on a surface of the valve block to have straight lines and curved lines, and the plurality of oil passages are engraved on the surface of the valve block.

The master cylinder and the valve block may be in surface contact with each other, and a sealing member may be disposed between the master cylinder and the valve block to prevent the braking hydraulic pressure from leaking to an outer side.

The sealing member may be provided to be in surface contact between the master cylinder and the valve block, and oil passage connection holes may be formed at the sealing member to be in communication with parts of the plurality of oil passages.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, the embodiments of the present invention will be described in detail with reference to accompanying drawings. It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
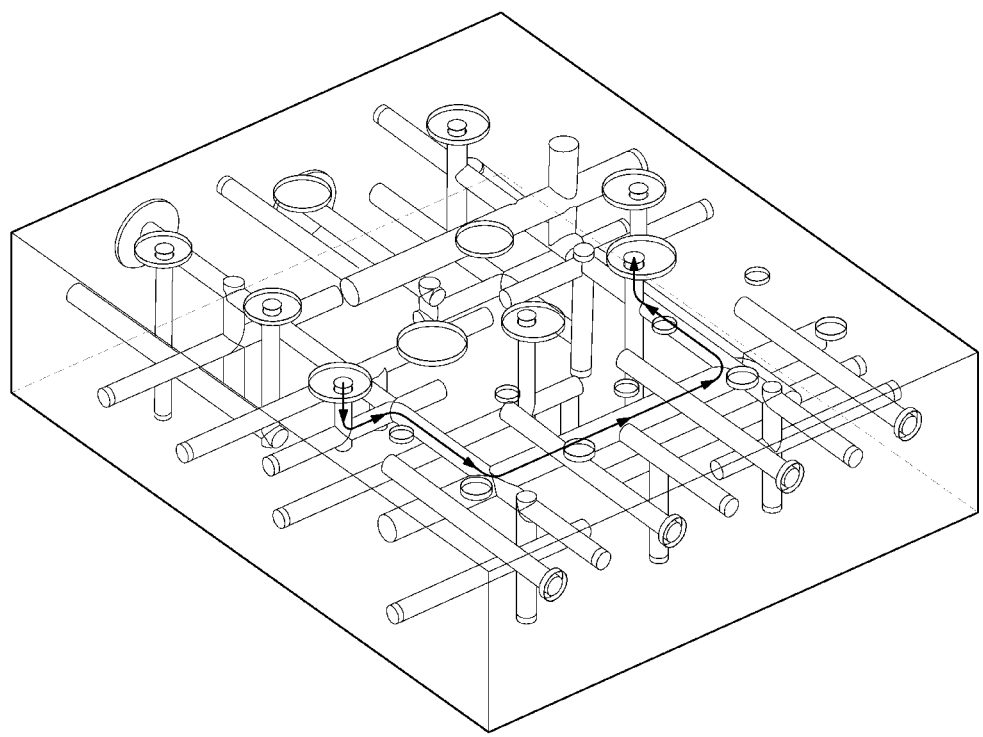
FIG. 1 is a view of a valve block provided at a conventional brake system.
Figure 2:
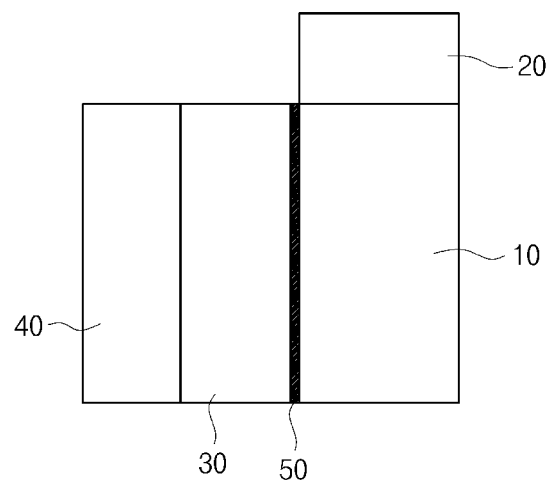
FIG. 2 is a block diagram schematically illustrating a hydraulic unit of a brake system according to one embodiment of the present invention.

FIG. 2 is a block diagram schematically illustrating a hydraulic unit of a brake system according to one embodiment of the present invention.

Referring to the drawing, the hydraulic unit of the brake system according to one embodiment of the present invention includes a master cylinder 10 configured to generate a braking hydraulic pressure, a reserver 20 installed on the master cylinder 10 to provide oil, a valve block 30 coupled to the master cylinder 10 and configured to transmit the braking hydraulic pressure transmitted from the master cylinder 10 to a wheel cylinder (not shown), an ECU 40 installed at the valve block 30, and a sealing member 50 provided between the master cylinder 10 and the valve block 30.

Figure 3:
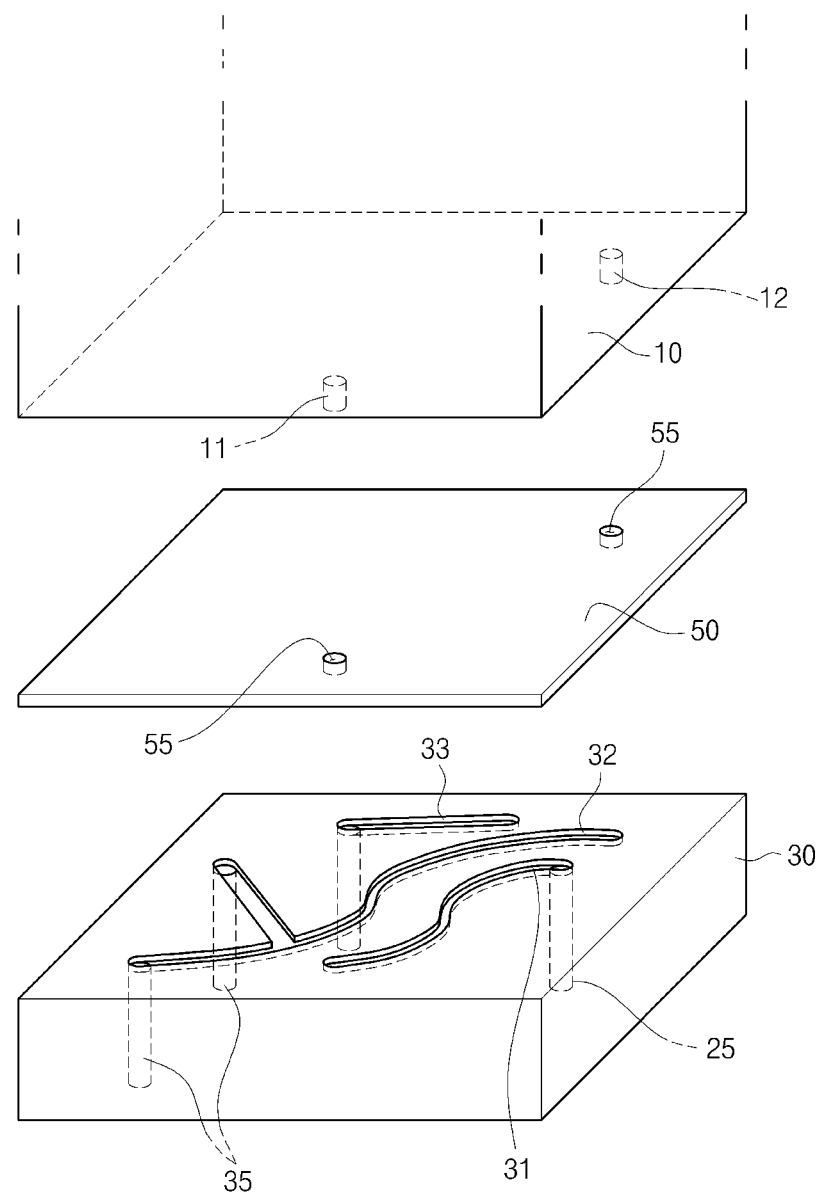
FIG. 3 is a view illustrating a state in which a master cylinder is coupled with a valve block of the brake system according to one embodiment of the present invention.

Here, the master cylinder 10 is connected with a brake pedal (not shown) and generates the braking hydraulic pressure by a brake pedal force. Hydraulic ports (referring to 11 and 12 of FIG. 3) through which the braking hydraulic pressure is transmitted are formed at the master cylinder 10. As illustrated in FIG. 3, the hydraulic ports 11 and 12 are in communication with one of a plurality of oil passages 31, 32, and 33 formed at the valve block 30. At this time, the braking hydraulic pressure through the oil passage 31, 32, and 33 is transmitted to the wheel cylinder (not shown) through a bore 35 formed at the valve block 30.

Typically, the valve block has a hydraulic circuit (oil passage) and a plurality of valves, through which the braking hydraulic pressure is transmitted to the wheel cylinder, to transmit the braking hydraulic pressure to the wheel cylinder and also to control an oil flow. The valve block has a rectangular parallelepiped shape formed of aluminum, and may be referred to as a modulator block. According to one embodiment of the present invention, the valve block 30 is coupled with the master cylinder 10 to transmit the braking hydraulic pressure to the wheel cylinder, and has the plurality of valves (not shown) and the bores 35 therein. Referring to FIG. 3, a plurality of bores 35 are formed at the valve block 30 to transmit the braking hydraulic pressure to the wheel cylinder (not shown), and the valves (not shown) are installed at the bores 35 to control the oil flow having the braking hydraulic pressure. Although not shown in the drawings, an internal oil passage configured to connect the bores 35 or a bore connected with the oil passages 31, 32, and 33, which will be described later, may be further provided in the valve block 30. The internal oil passage and the bore may be changed according to a design of controlling the oil flow having the braking hydraulic pressure. At this time, the valve provided at the valve block 30 is electronically controlled by the ECU 40. The ECU 40 and the reserver 20 are well-known techniques which are generally used the brake system, and thus the detail description thereof will be omitted.

Referring to FIG. 3 again, the hydraulic ports 11 and 12 formed at the master cylinder 10 and the plurality of oil passages 31, 32, and 33 formed in the straight line and curved line shapes and configured to connect the bores 35 are formed at a surface of the valve block 30. The plurality of oil passage 31, 32, and 33 are engraved on the surface of the valve block 30. According to the drawing, the plurality of oil passages 31, 32, and 33 include a first oil passage 31 which is curved, a second oil passage 32 in which a curved passage and a straight passage are connected, and a third oil passage 33 which is straight. However, it should be understood that this is just an example, and variously shaped oil passages may be further provided according to the design of the oil passages 31, 32, and 33, and the oil passages may be connected with each other. As described above, the valve block 30 is in surface contact with and coupled to the master cylinder 10, and thus the oil may flow through the engraved oil passages 31, 32, and 33.

According to one embodiment of the present invention, the sealing member 50 is provided between the master cylinder 10 and the valve block 30 to prevent the oil having the braking hydraulic pressure from leaking to an outer side. The sealing member 50 has a shape corresponding to a contact surface between the master cylinder 10 and the valve block 30 so as to be in surface contact between the master cylinder 10 and the valve block 30. The sealing member 50 having a plate shape also has oil passage connection holes 55 which are in communication with parts of the hydraulic ports 11 and 12 and the plurality of oil passages 31, 32, and 33. At this time, the oil passage connection holes 55 may be formed at positions corresponding to ends of the oil passages 31, 32, and 33 considering the oil flow having the hydraulic pressure. According to the drawing, the oil passage connection holes 55 are formed at the positions corresponding to the hydraulic ports 11 and 12 of the master cylinder 10, and in communication with the first and second oil passages 31 and 32, respectively. Therefore, the braking hydraulic pressure generated from the master cylinder 10 is transmitted to the first and second oil passages 31 and 32 through the oil passage connection holes 55, and then transmitted to the bores 35 of the valve block 30 through the first and second oil passages 31 and 32. That is, the oil passages 31, 32, and 33 are freely designed to have the straight lines and the curved lines, such that the braking hydraulic pressure generated from the master cylinder 10 is transmitted to the wheel cylinder (not shown) through the valve block 30. Further, as described above, the oil flow having the hydraulic pressure may be freely designed to connect parts of the plurality of oil passages 31, 32, and 33 or to connect parts of the bores 35 formed at the respective oil passages 31, 32, and 33 such that the braking hydraulic pressure is transmitted to the wheel cylinder, or the like.

Meanwhile, it has been described and illustrated that the sealing member 50 is provided to be in surface contact between the master cylinder 10 and the valve block 30, but the present invention is not limited thereto. Any shapes may be all right as long as the oil having the hydraulic pressure does not leak between the master cylinder 10 and the valve block 30. For example, the sealing member may have the shape corresponding to the plurality of oil passages 31, 32, and 33 between the master cylinder 10 and the valve block 30 to have a closed loop shape which is connected along an edge of each of the oil passages 31, 32, and 33.

As a result, in the hydraulic unit of the brake system according to one embodiment of the present invention, the plurality of the oil passages 31, 32, and 33 having the straight lines and the curved lines are engraved on the surface of the valve block 30 so that the braking hydraulic pressure generated from the master cylinder 10 is transmitted to the wheel cylinder (not shown), and thus components may be freely arranged through the free design of the oil passages 31, 32, and 33. Therefore, the machining cycle time for connecting or forming the oil passages may be reduced compared with the conventional brake system, and also a compact product may be provided through the free design of the oil passages. Further, compared with the conventional brake system, a size and a thickness of the valve block may be reduced due to the securing of the oil passage space, and thus a weight and manufacturing cost thereof may be also reduced.

According to the hydraulic unit of the brake system, since the straight and curved oil passages are engraved on the surface of the valve block, the oil passages may be freely designed and thus the components may be also freely arranged. Therefore, the machining cycle time for forming the oil passages may be reduced compared with the conventional brake system, and also the compact product may be provided through the free design of the oil passages.

Further, compared with the conventional brake system, the size and the thickness of the valve block may be reduced due to the securing of the oil passage space, and thus the weight and manufacturing cost thereof may be also reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A hydraulic unit of a brake system, comprising:
a master cylinder configured to generate a hydraulic pressure to supply a braking hydraulic pressure to a wheel cylinder of a vehicle;
a valve block coupled with the master cylinder to transmit the braking hydraulic pressure to the wheel cylinder and having a plurality of valves and borers;
an electronic control unit (ECU) installed at the valve block to control the plurality of valves,
wherein a plurality of oil passages configured to connect the bores with hydraulic ports formed at the master cylinder are formed on a surface of the valve block,
wherein the plurality of oil passages comprises straight and curved oil passages, and
wherein the plurality of oil passages is engraved on the surface of the valve block; and
a sealing member disposed between the master cylinder and the valve block to prevent the braking hydraulic pressure from leaking to an outer side,
wherein the sealing member has a closed shape which is connected along edges of each of the plurality of oil passages.

2. The hydraulic unit according to claim 1, wherein the master cylinder and the valve block are in surface contact with each other.

3. The hydraulic unit according to claim 2, wherein the sealing member is provided to be in surface contact between the master cylinder and the valve block, and
oil passage connection holes are formed at the sealing member to be in communication with parts of the plurality of oil passages.

* * * * *